Aug. 16, 1960    A. O. CEDENO    2,949,067
TRAFFIC INTERSECTION
Filed May 24, 1957    6 Sheets-Sheet 1

INVENTOR
Arturo O. Cedeno
BY
ATTORNEYS

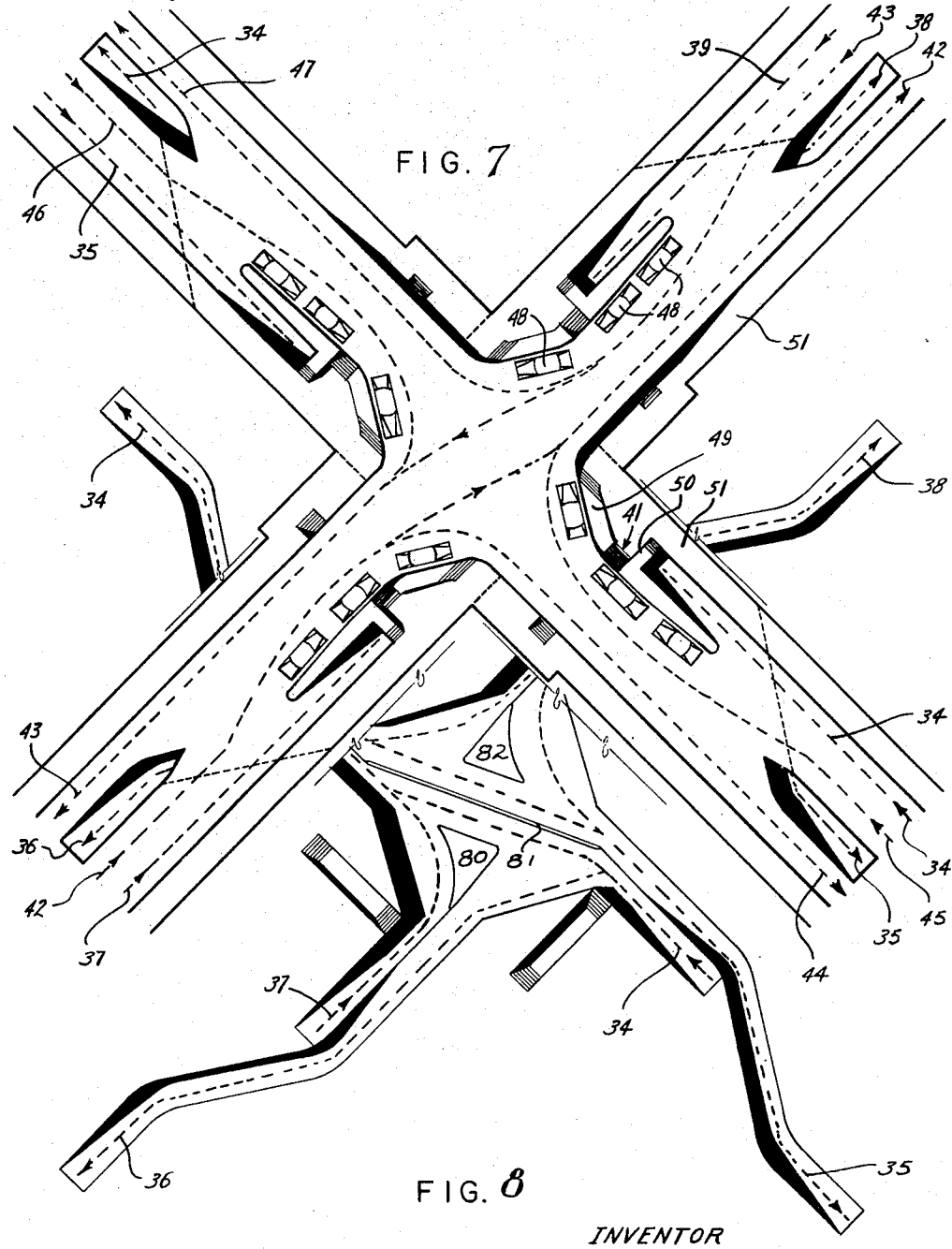

INVENTOR
Arturo O. Cedeno

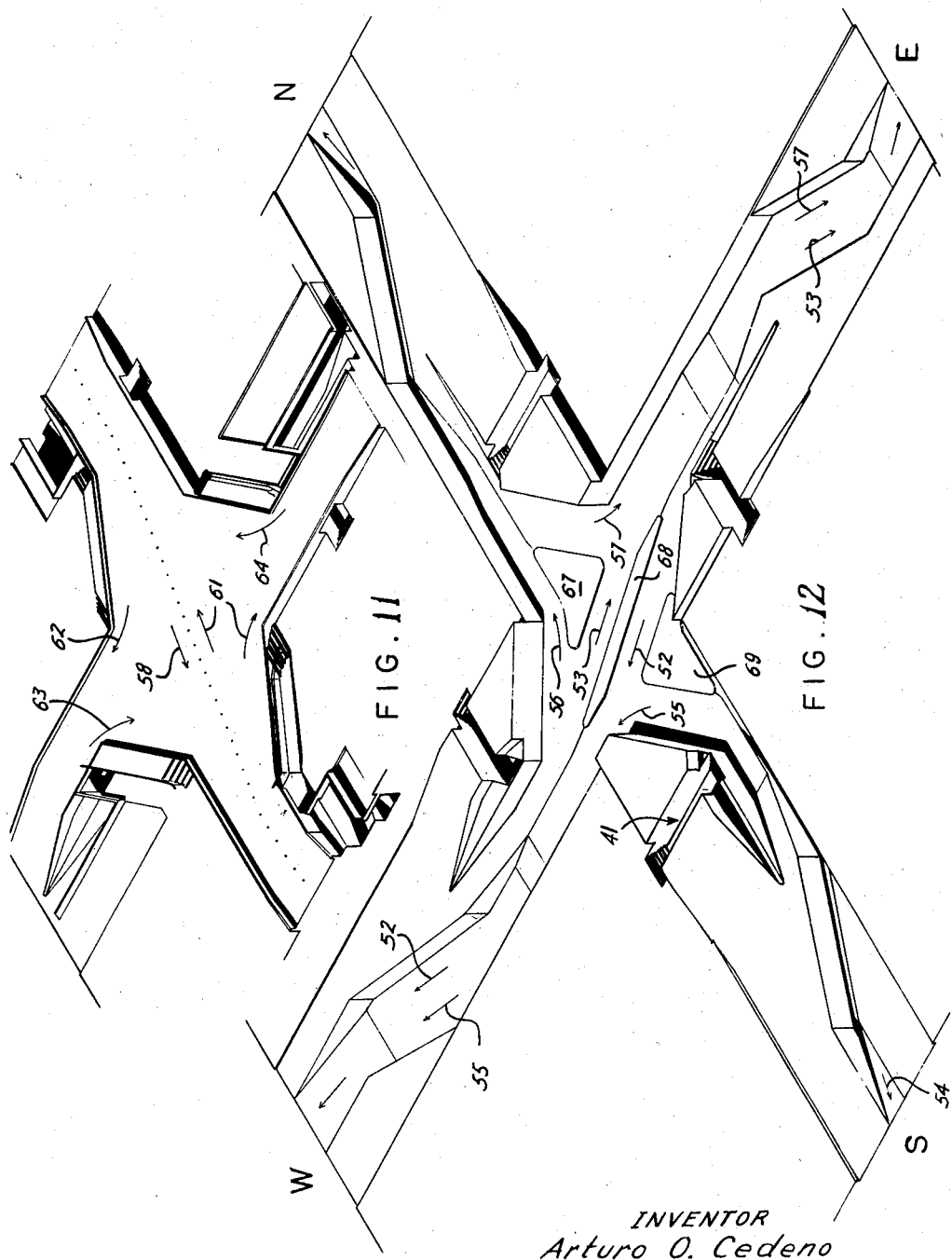

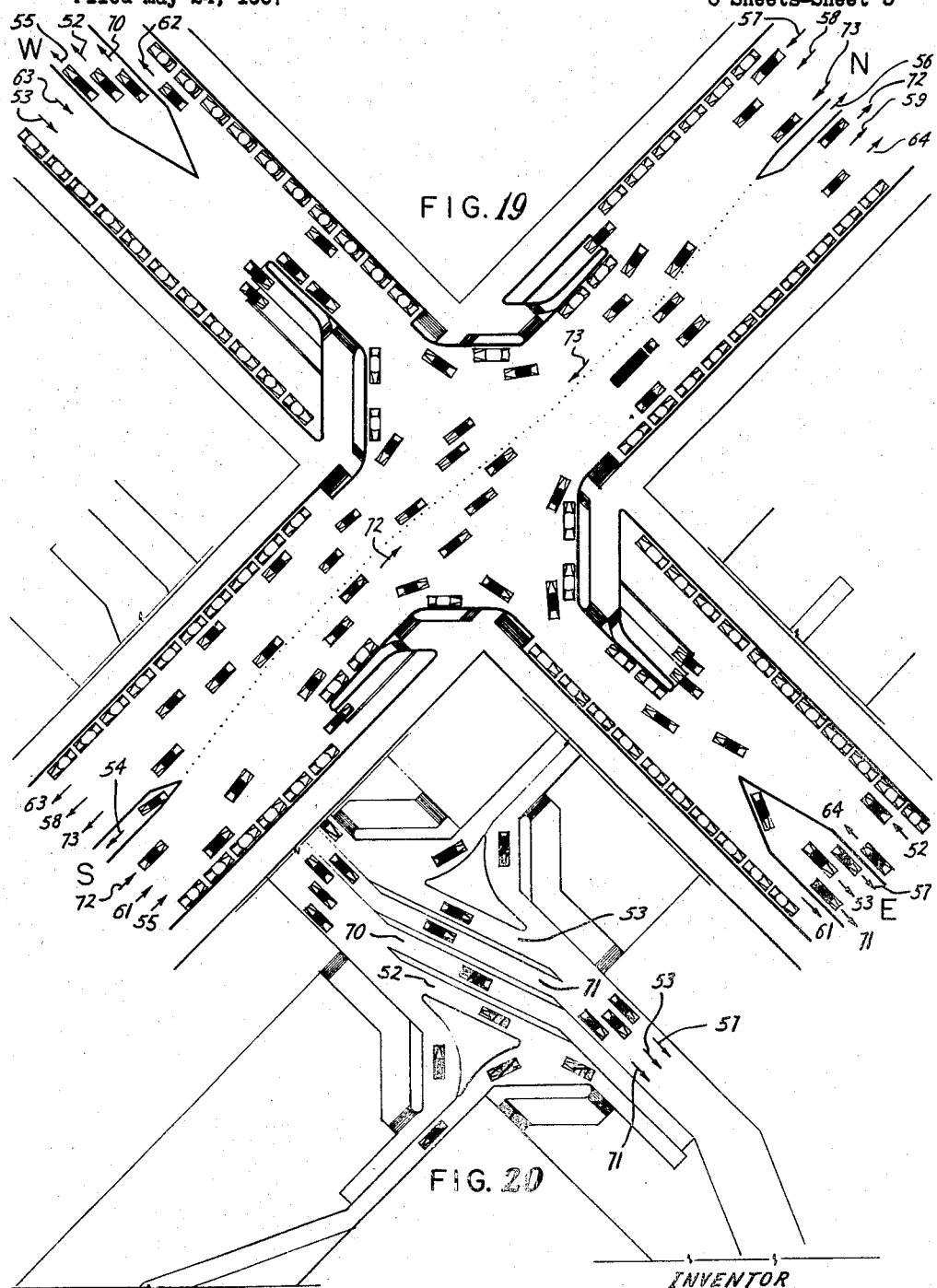

Aug. 16, 1960    A. O. CEDENO    2,949,067
TRAFFIC INTERSECTION
Filed May 24, 1957    6 Sheets-Sheet 6
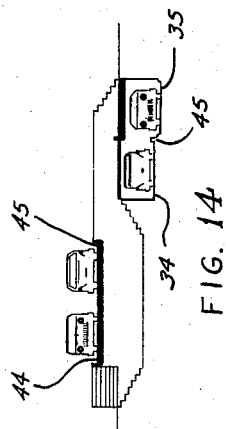
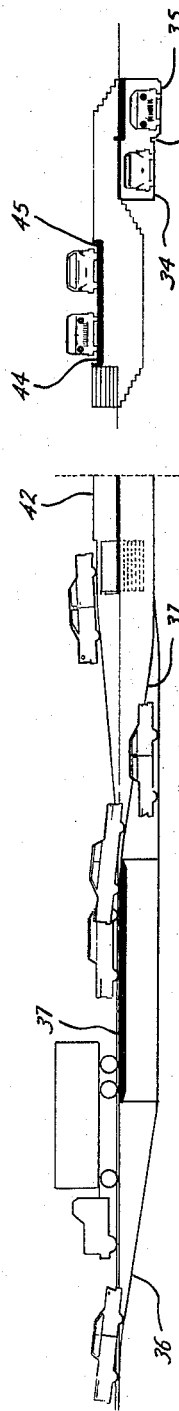
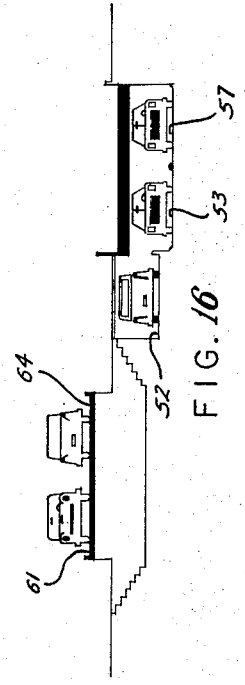
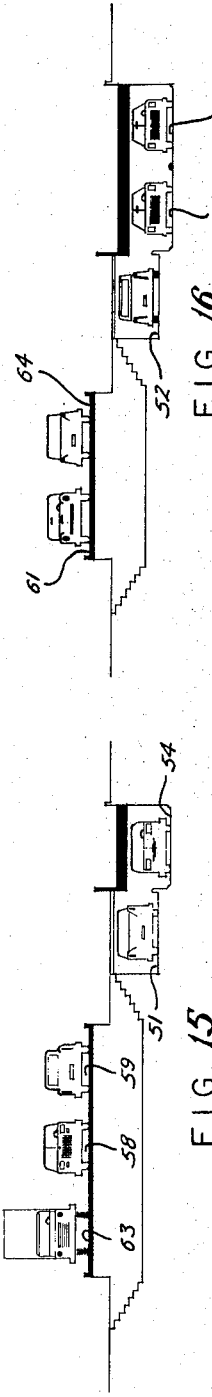
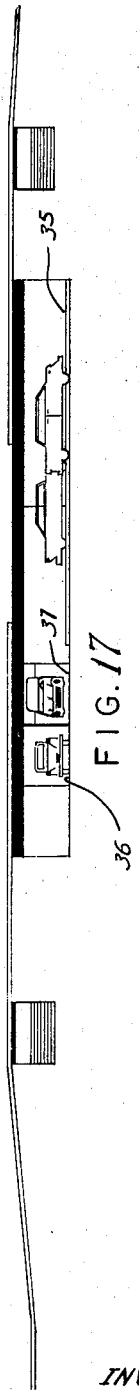
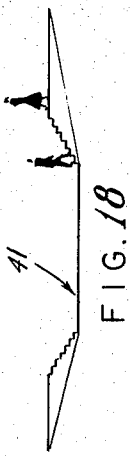
INVENTOR
Arturo O. Cedeno
BY
ATTORNEYS

United States Patent Office 2,949,067
Patented Aug. 16, 1960

2,949,067

TRAFFIC INTERSECTION

Arturo Olivero Cedeno, Ocampo 1073, Monterrey, Nuevo Leon, Mexico

Filed May 24, 1957, Ser. No. 661,470

5 Claims. (Cl. 94—1)

This invention relates to traffic intersections and more particularly to intersections providing for continuous flow of traffic on intersecting streets. In one form it also provides for continuous pedestrian flow across intersecting streets.

The handling of modern day vehicular traffic at intersections is one of the most pressing traffic problems for which no completely satisfactory answer has been found.

The volume and speed of traffic is such that continuous flow of vehicles on main arteries of traffic is very desirable. Elaborate cloverleaves and multiple bridge intersections provide for continuous flow of traffic, but they are tremendously expensive. In cities the value of land is very high and due to the great amount of land necessary to present day cloverleaves, traffic circles, etc., these types of intersections can only be built for a reasonable cost on low cost property such as slum areas, undeveloped banks of streams, etc. Where they are built in other areas the cost of right of way is tremendous. Main streets of a city cannot be provided with continuous flow of traffic in this manner because of the high land cost of developed property; particularly commercial property bordering main streets.

This invention provides a traffic intersection for continuous flow of traffic which occupies a minimum area. In cities the intersection may be constructed using only the space provided by normal multi-lane streets and does not require the acquisition of expensive adjoining property. The invention also provides for continuous pedestrian flow, and in its preferred form it permits pedestrians to cross a street with only one change in elevation during the crossing.

An object of this invention is to provide a traffic intersection for continuous flow of traffic in all directions which may be constructed on a minimum area of land.

Another object is to provide a traffic intersection for continuous flow of traffic which may be installed on a normal city street right of way.

Another object is to provide a traffic intersection for continuous flow of traffic using only two levels and without cloverleaves, detours or the like.

Another object is to provide a traffic intersection for continuous flow of traffic using only two levels in which direct right and left turns may be made without crossing lanes.

Another object is to provide a traffic intersection for continuous flow of traffic in which normal and continuous pedestrian travel is provided for.

Another object is to provide a traffic intersection for continuous flow of traffic which may be installed on a normal city street right of way in which normal pedestrian traffic is provided for and a pedestrian need change levels only once in crossing a street.

Another object is to provide a traffic intersection as in the preceding object which additionally has provisions for limited parking and entraining passengers.

Another object is to provide a traffic intersection for continuous flow of traffic at city street intersections in which all pedestrian travel is removed from the streets to increase the safety of pedestrians.

Another object is to provide a traffic intersection which provides for safe uninterrupted travel for both pedestrians and vehicles on city streets.

Another object is to provide a traffic intersection which will provide an increase in turning radius for vehicles turning to the right or to the left.

Another object is to provide a traffic intersection which will permit a continuous flow of vehicle and pedestrian traffic in all directions without the necessity of any above ground obstructions above normal pedestrian eye level.

Other objects, features, and advantages of this invention will be apparent from the drawings, the specification, and the claims.

In the drawings wherein there are shown illustrative embodiments of this invention and wherein like reference numerals indicate like parts:

Figs. 7 and 8 are plan views of the upper and lower levels, respectively, of the intersection of Fig. 3;

Figs. 11 and 12 are perspective views of the upper and lower levels, respectively, of the intersection shown in Fig. 6;

Fig. 13 is a diagrammatic sectional view taken along the lines 13—13 of Fig. 3;

Fig. 14 is a diagrammatic sectional view taken along the lines 14—14 of Fig. 3;

Fig. 15 is a diagrammatic cross-sectional view taken along the lines 15—15 of Fig. 6;

Fig. 16 is a diagrammatic cross-sectional view taken along the lines 16—16 of Fig. 6;

Fig. 17 is a diagrammatic cross-sectional view taken along the lines 17—17 of Fig. 3;

Fig. 18 is a diagrammatic illustration of one of the pedestrian ramps; and

Figs. 19 and 20 are plan views of the upper and lower levels, respectively, of an intersection similar to Fig. 6 but enlarged to accommodate additional through lanes.

Figure 1:
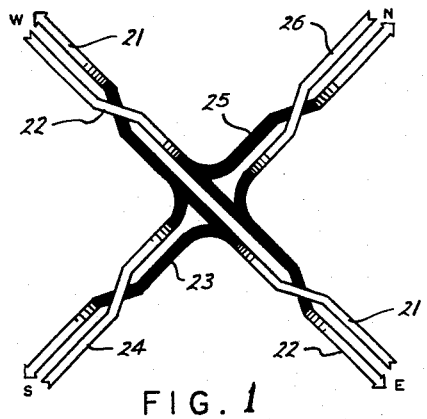
Fig. 1 is a schematic illustration of the lower level of an intersection constructed in accordance with this invention with the lanes at street level shown in outline and the lanes at the lower level shown in solid black.
Figure 4:
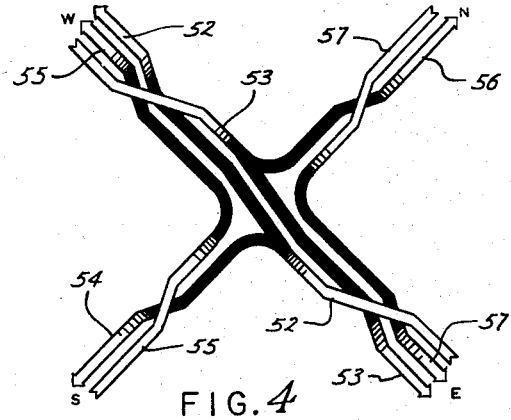
Fig. 4 is a view similar to Fig. 1, in which outbound lanes have been added for each street to avoid merging traffic in the intersection.

The intersections of this invention may be constructed with their levels at any desired elevation. In the forms shown in the drawings, the lower level is below ground level, and the upper level is above ground level.

Referring first to Fig. 1, there is shown the lower level of an intersection and the manner in which provision is made for through traffic on one street and for left turns in all directions between all streets. This figure well exemplifies a basic concept of this invention, which is to reverse the street relationship of vehicles in one level so that they are traveling on the left side of the street. With the lanes so arranged, left turns may be made in the intersection without crossing lanes. Pairs of lanes on each street cross each other before entering the intersection. The inbound lane of each pair connects with the outbound lane of the adjacent clockwise pair. This provides for left turns. Inbound lanes on one street also connect with the outbound lane of the second clockwise pair to provide for through traffic on one street. A vehicle proceeding west on the east-west street, labeled E, W, travels in lane 21. Before reaching the intersection, lane 21 passes over lane 22, which handles east bound traffic. This reverses the street relationship of the vehicles as they enter the center of the intersection, and a car in lane 21 is on the left hand side of the street. As the vehicle enters the intersection, the operator has the option of proceeding along lane 21 through the intersection. In so proceeding, the vehicle will pass under the on-coming lane 22 on the opposite side of the intersection and resume its normal right hand relationship with other vehicles on the street after leaving the intersection. As an alternative, the vehicle proceeding along lane 21 may turn left and head south on the north-south street (labeled N, S) by making a left turn onto lane 23. After leaving the center of the intersection, lane 23 passes under the north bound lane 24 on the north-south street and resumes its normal right hand relationship heading south.

In like manner, a car proceeding east on the east-west street may proceed along lane 22, pass over lane 21 before entering the intersection and by continuing straight remain east bound. After leaving the intersection, east bound traffic will pass under the west bound lane 21 and resume its normal right hand relationship on the street.

East bound traffic may also turn left on lane 25 to proceed in a northerly direction. After turning left, lane 25 passes under the on-coming traffic on lane 26 and resumes normal relationship of street traffic.

North bound traffic which enters lane 24 enters the intersection on the left hand side of the street after passing over lane 23 and must make a left hand turn. This traffic merges with the west outbound traffic on lane 21 as it proceeds along the east-west street in a westerly direction.

South bound traffic entering the intersection on lane 26 must turn left in the same manner as north bound traffic on lane 24. After turning left, the south bound traffic on lane 26 merges with the east bound traffic on lane 22. After passing under lane 21, this traffic resumes its normal relationship with on-coming vehicles on the east bound street.

Figure 2:
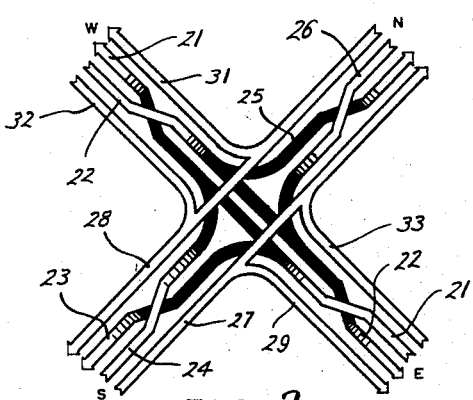
Fig. 2 is a view similar to Fig. 1 with the upper level of the intersection shown superimposed upon the lanes of Fig. 1.

Referring now to Fig. 2, it will be noted that the lanes of Fig. 1 are shown and that there are super-imposed thereon the upper level traffic, which provides for through traffic along the north-south street and for right turns in all directions. For north bound traffic on the north-south street, lane 27 is provided. For south bound traffic on the north-south street lane 28 is provided. North and south bound traffic on entering the intersection has the option of proceeding straight or making right turns on lanes 29 and 31, respectively.

Vehicles on the east-west street which wish to turn right may do so by east bound traffic entering lane 32, which merges with lane 28 on the upper level of the intersection. Inbound traffic in lane 32 must turn right and proceed south. In like manner, west bound traffic may enter lane 33, which merges with north bound lane 27, and upon entering the intersection must turn right and proceed north.

With an intersection constructed as shown in Fig. 2, vehicles may proceed through the intersection in continuous flow and may turn in any desired direction or may proceed straight. Inasmuch as it is only necessary to make a 90-degree turn to change directions, it is not necessary to employ cloverleaves or elaborate traffic circles to permit a change in direction. This permits the lanes of the intersection to be confined to the usual cross pattern found at conventional single level intersections, and for this reason the intersections of this invention may be installed within the boundaries of the usual street crossing.

The Fig. 2 form of intersection is simple in form and will be used where pedestrian traffic does not present a problem. If desired, pedestrian ramps may be run under the lanes 27 and 28 and over lanes 23 and 24 on the south bound street. Ramps may also be similarly positioned on the other streets. Ramps so constructed will require that pedestrians change elevations twice to cross a street.

Figure 3:
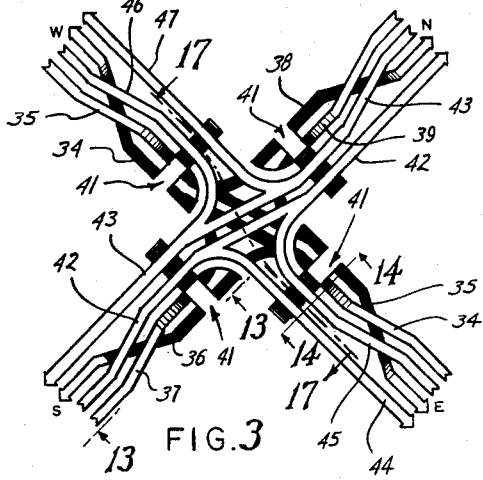
Fig. 3 is a schematic view similar to Fig. 2 with the lanes at each level adjacent; the center of the intersection positioned close together on opposite sides of the streets and pedestrian ramps extending across the streets at these points.

Referring now to Figs. 3, 7, and 8, there is shown a form of this invention for use at an intersection where it is only possible to provide for four-lane traffic and in which it is desired to provide pedestrian ramps for crossing the streets leading from the intersection. The same number of lanes is provided in the Fig. 3 as in the Fig. 2 of the invention. However, to avoid the necessity of pedestrians changing levels twice in crossing a street the lanes are arranged so that all of the lanes of the upper level at a point adjacent the center of the intersection are one side of the street, and all of the lanes of the lower level at this point are on the other side of the street. This permits a ramp to extend across the street with only one change in elevation, that is, from street level to below ground level and return to street level.

Through traffic on the east-west lane is provided by lanes 34 and 35. It will be noted that lanes 34 and 35 on each side of the intersection cross over before entering the center of the intersection. Left turn traffic is provided for by pairs of lanes 36 and 37 on the south side of the intersection and 38 and 39 on the north side of the intersection. Lanes 36 and 37 communicate with through lane 34 with west to south bound traffic passing from lane 34 to lane 36 and with south to west bound traffic passing from lane 37 to lane 34. East bound traffic desiring to turn to north passes from lane 35 to 38 and south bound traffic desiring to turn east passes from lane 39 to 35. It will be noted that each of the pairs of lanes 36—37 and 38—39 are together on the right hand side of the north-south street on opposite sides of the intersection. As lanes 34 through 39 are all of the lower level lanes and are all respectively positioned on the right hand half of the street, the pedestrian ramps indicated generally at 41 may pass over the top of each of these lanes.

The north-south through traffic is handled by lanes 42 and 43, which pass over the upper level of the intersection. Right turn traffic is provided for by pairs of lanes 44 and 45 on the east side of the intersection and 46 and 47 on the west side of the intersection. The east pair of lanes feed to and receive traffic from through lane 42, and the west pair of lanes feed to and receive traffic from through lane 43.

The through lanes 42 and 43 and the two pairs of right turn lanes are arranged close together on each street on each side of the intersection. They are also on the opposite side of the street from the lanes leading to and from the lower level. Therefore, the ramps 41 may drop down under the lanes leading to and from the upper level and pass thereunder to permit pedestrians to cross each street with only one change of elevation.

The traffic in the upper level flows more or less in conventional manner and may be separated with conventional lane markings, or if desired, curbs or esplanades may be provided to maintain the traffic in the desired lanes. In the lower lanes, the cross-over feature of this invention causes automobiles to pass each other in the opposite relationship to their normal street relationship. For this reason, it is preferred that a clear division of lanes be maintained by curbs, islands, et cetera, so that no car can cross into the wrong lane. When the lower level cars are in the center of the intersection, they will be at approximately the same level, and it is preferred that the lanes be clearly separated by islands such as 80, 81, and 82. The approach lanes to the center of the intersection will be at different elevations, as best shown in Fig. 14, and there will be little likelihood of cars moving over to the wrong lanes. However, if desired, a curb may be provided even between these lanes, as shown at 45 (Fig. 14).

Referring to Fig. 7, it will be noted that there is a small parking area provided at each corner. This parking area is occupied by cars shown at 48. Access to these cars is provided by ramps 49 and 50, which communicate with the crossing ramps 41 and with the sidewalk 51. This arrangement will permit loading and discharge of passengers at the corners.

Referring to Fig. 14, it will be seen that if desired, the lower level may be spaced only a short distance below the upper level. This will permit the intersection to be constructed using a lower level only a few feet below the surface and an upper level only a few feet above the surface. However, it necessitates the restriction of truck traffic to use of the upper level only. By proper coordination of the intersections in a city, this would not materially interfere with truck traffic and would decrease the cost of the intersections and particularly the height of the stairs which pedestrians would have to negotiate. If desired, however, the two levels may be spaced apart by a sufficient distance to handle truck traffic. In this case it might be possible to handle pedestrian traffic with escalators if it is found that the stairway is too high.

While the Fig. 3 form of intersection will be satisfactory where there is only room for four lanes of traffic, it has the disadvantage of merging traffic in all four through lanes.

In order to eliminate all merging traffic in the intersection, the form of this invention illustrated in Figs. 4 through 6 and 9 through 12 may be employed where it is possible to have a five-lane intersection.

In this form of the invention, through traffic on the east-west street is provided by lanes 52 and 53. Cars proceeding west and wishing to turn south may turn from lane 52 onto lane 54. Traffic proceeding north on the north-south street and wishing to turn west uses lane 55, which passes through the lower level and out to the east-west street without merging with the through traffic on lane 52 as in the Fig. 3 form of invention. In like manner, traffic turning left to the north branches off from lane 53 onto lane 56. Traffic proceeding south and desiring to turn east uses lane 57, which passes through the intersection without merging with the through lane 53. Therefore, left turns may be made in all directions without merging with other lanes of traffic, and there will be no cause for delay of vehicles using the lower level.

In like manner, right turn traffic is provided for in the upper level without merging traffic. Through traffic is provided on the north-south street by lanes 58 and 59. Traffic in lane 59 desiring to turn east may turn onto lane 61. Traffic proceeding south in lane 58 turns west on lane 62. Separate angle-lanes 63 and 64 are provided in the angles made by lanes 58—62 and lanes 59—61, respectively, to provide for right turn traffic from east to north and from west to south.

Figure 5:
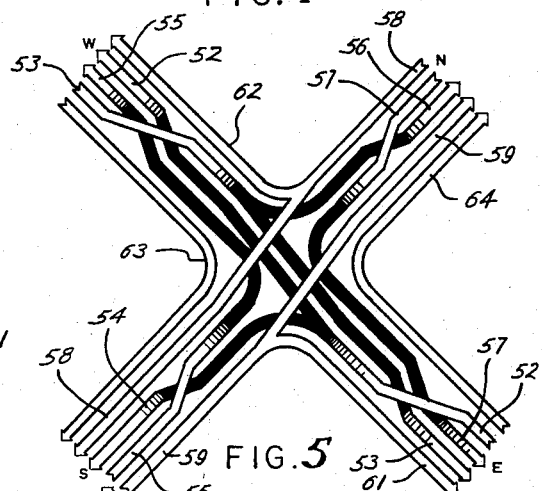
Fig. 5 is a view similar to Fig. 2, in which outbound lanes have been added in both levels to avoid merging traffic in both the upper and lower levels.
Figure 6:
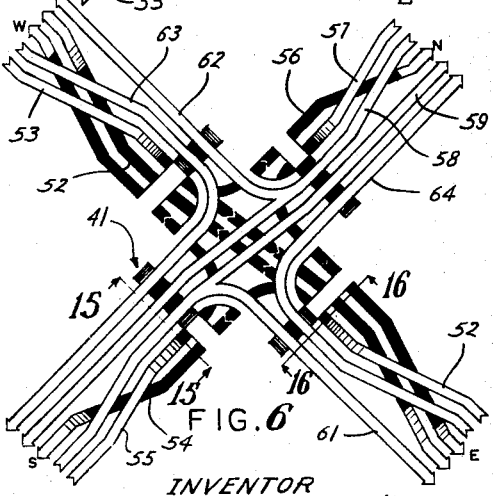
Fig. 6 is a view similar to Fig. 3, in which the lanes of the Fig. 5 embodiment have been arranged to permit ramps across each street for pedestrian traffic with only one change in elevation for crossing each street.
Figures 9, 10:
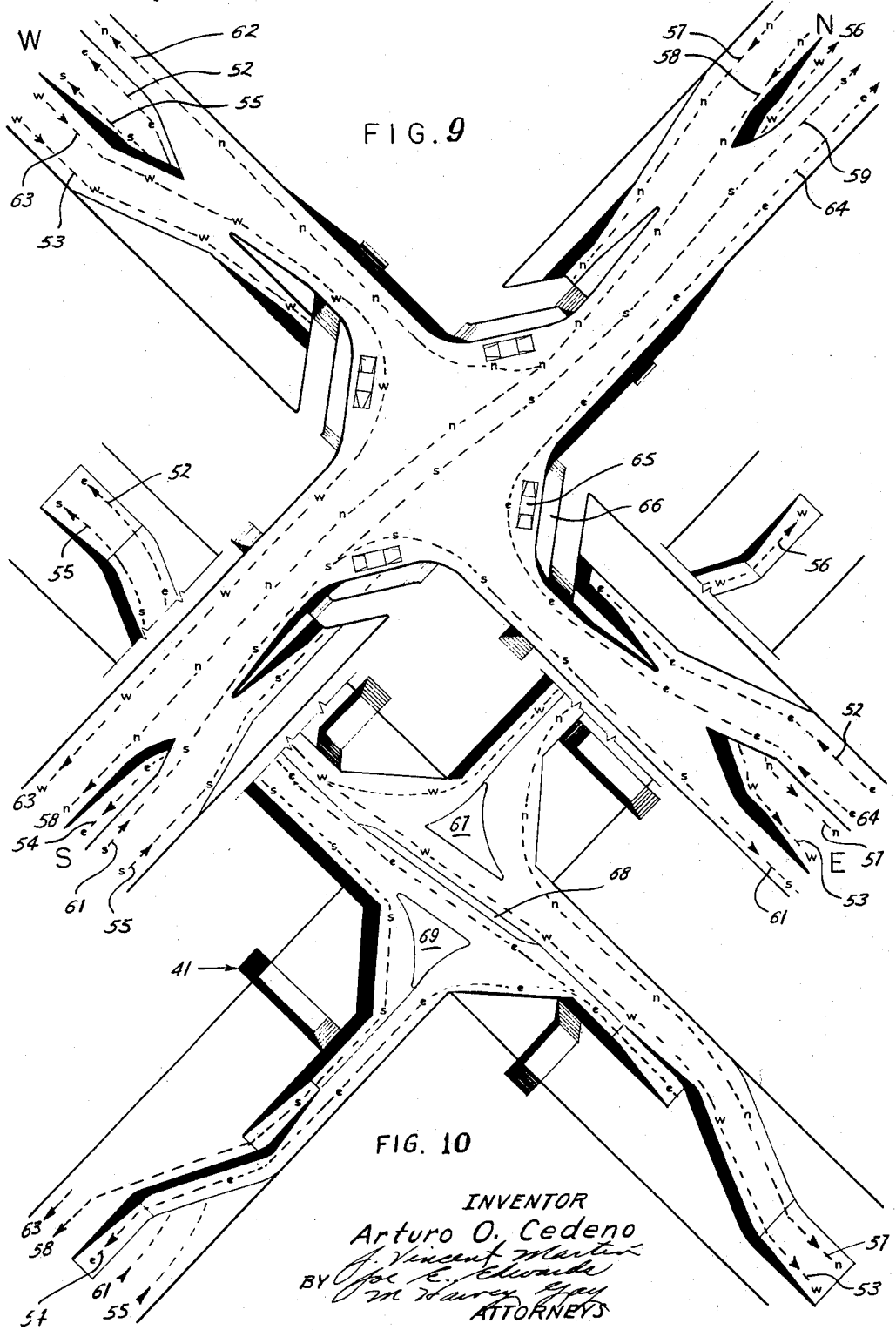
Figs. 9 and 10 are plan views of the upper and lower levels, respectively, of the street intersection of Fig. 6.

As in the case of the four-lane form of invention, the lanes may be positioned without regard to pedestrian traffic as in Fig. 5, or they may be positioned for the convenience of pedestrians as in Fig. 6. In the latter case the lanes of the upper level are positioned on one side of the street, and all lanes of the lower level are on the other side of the street at points closely adjacent to the center of the intersection to provide for pedestrian travel across the street without more than one change in elevation. Of course, in this form of invention the cross-over of traffic to and from the lower level is slightly more complex than in the Fig. 3 form of invention in that the cross-over on the east-west street is two lanes crossing under two lanes.

Again space is provided for at least one car 65 to take on and discharge passengers from ramp 66 at each corner. Again, islands 67, 68, and 69 separate traffic in the lower level, and the traffic is vertically separated in the approaches to the lower level, where it proceeds in opposite directions. Note Figs. 15 and 16.

Figs. 19 and 20 illustrate the manner in which the intersection may be expanded for larger intersections. In this case, the intersection is substantially the same as illustrated in Fig. 6 except that an extra pair of through lanes handling through traffic is opposite directions are provided on both the upper and lower levels. In Fig. 20 lane 70 provides an extra through lane for east bound traffic, and lane 71 provides an extra through lane for west bound traffic. In like manner, the upper level is provided with an extra lane 72 for through north bound traffic and an extra lane 73 for through south bound traffic. As these additional lanes in both the upper and lower levels are positioned adjacent to each other in the center of the intersection, they do not interfere with the operation of the other lanes, as explained in conjunction with the Fig. 6. In like manner, the intersection may be expanded to accommodate as many through lanes as desired.

Taking on and discharge of passengers at corners usually holds up a lane of traffic. This invention provides an intersection with room at the corners to pull out of traffic and load and discharge passengers. Note in Fig. 7 that the descending portion of lanes 34, 37, 35, and 39 are so positioned that space is provided for parking several cars at the corner. Even in Fig. 9, where lanes 52, 55, 53, and 57 are farther toward the center of the street, there is room for cars as shown at 65. In Fig. 19 there is again room for a number of cars at each corner.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A street crossing interchange comprising, a first street and a second street each having a plurality of approach lanes and a plurality of departure lanes for traffic travelling in opposite directions with the through lanes of the second street crossing the through lanes of the first street at different grade levels, said second street approach through lanes being in approximately the middle of said second street and in one of said levels at points adjacent said first street, left turn lanes branching from said through lanes as said left turn lanes approach said first street and extending along the left sides of said first street and connecting with the departure through lanes of said first street, others of said second street approach lanes including right turn lanes extending along approximately the center of said second street on the left sides of said approach through lanes to the other level and then curving right as they approach said first street and connecting with departure lanes of said first street, said first street approach through lanes being in approximately the middle of said first street and in the other level at points adjacent said second street, and right turn lanes branching from said through lanes as said right turn lanes approach said second street and extending along the right sides of said second street and connecting with the departure lanes of said second street, others of said first street approach lanes including left turn lanes extending along approximately the center of said first street on the right sides of said approach through lanes to said one level and then curving left as they approach said second street, said first street left turn lanes extending along the left sides of said second street and connecting with the second street departure through lanes, said second street approach and departure lanes with the exception of the departure right turn lanes from said first street crossing each other at different elevations at points remote from and on opposite sides of said first street, said first street approach lanes crossing said departure left turn lanes from said second street at different elevations at points remote from and on opposite sides of said second street.

2. The street crossing interchange of claim 1 wherein pedestrian ramps extend across each street between said points of branching of said turn lanes and said crossing of lanes at points remote from the crossing streets with the ramps extending above lanes communicating with the lower of the levels and below the lanes communicating with the upper of the levels.

3. A street crossing interchange comprising, a first street and a second street each having a plurality of approach lanes and a plurality of departure lanes for traffic travelling in opposite directions with the through lanes of the second street crossing below the through lanes of the first street, said second street approach through lanes being in approximately the middle of said second street and in the lower level at points adjacent said first street, left turn lanes branching from said through lanes as said left turn lanes approach said first street and extending along the left sides of said first street and connecting with the departure through lanes of said first street, others of said second street approach lanes including right turn lanes extending along approximately the center of said second street on the left sides of said approach through lanes, to the upper level and then curving right as they approach said first street and connecting with departure lanes of said first street, said first street approach through lanes being in approximately the middle of said first street and in the upper level at points adjacent said second street, and right turn lanes branching from said through lanes as said right turn lanes approach said second street and extending along the right sides of said second street and connecting with the departure lanes of said second street, others of said first street approach lanes including left turn lanes extending along approximately the center of said first street on the right sides of said approach through lanes to the lower level and then curving left as they approach said second street, said first street left turn lanes extending along the left sides of said second street and connecting with the second street departure through lanes, said second street approach and departure lanes with the exception of the departure right turn lanes from said first street crossing each other at different elevations at points remote from and on opposite sides of said first street, said first street approach lanes crossing said departure left turn lanes from said second street at different elevations at points remote from and on opposite sides of said second street.

4. The street crossing interchange of claim 3 wherein the left turn lanes from each street cross under the approach lanes of the other street.

5. The street crossing interchange of claim 3 wherein pedestrian ramps extend across said second street below the right turn approach and departure lanes and above the other approach and departure lanes between said point of branching of said left turn lanes and said crossing of said second street approach and departure lanes, and pedestrian ramps extend across said first street above the left turn approach and departure lanes and below the other approach and departure lanes between said point of branching of said right turn lanes and said crossing of said first street approach lanes and left turn departure lanes.

References Cited in the file of this patent

UNITED STATES PATENTS

| | | |
|---|---|---|
| 1,515,251 | Graves | Nov. 11, 1924 |
| 1,543,080 | Graves | June 23, 1925 |
| 1,628,935 | Turner et al. | May 17, 1927 |
| 1,661,490 | Mihaliak | Mar. 6, 1928 |
| 1,689,161 | Skultin | Oct. 23, 1928 |
| 1,981,361 | Jones | Nov. 20, 1934 |

FOREIGN PATENTS

| | | |
|---|---|---|
| 736,887 | Germany | July 1, 1943 |

OTHER REFERENCES

Textbook, "Policies on Geometric Highway Design," by American Association of State Highway Officials, reprinted 1950, page 161, of Booklet No. 7.

A Policy on Geometric Design of Rural Highways, by American Association of State Highway Officials, 1954, pages 48, 49, 392 and 393.